United States Patent [19]

Venkatesan

[11] Patent Number: 4,469,177

[45] Date of Patent: Sep. 4, 1984

[54] RECOVERY OF VISCOUS OIL FROM ASPHALTIC OIL-CONTAINING FORMATIONS

[75] Inventor: V. N. Venkatesan, Dallas, Tex.

[73] Assignee: Mobil Oil Corporation, New York, N.Y.

[21] Appl. No.: 445,120

[22] Filed: Nov. 29, 1982

[51] Int. Cl.$^3$ .................. E21B 43/24; E21B 43/27
[52] U.S. Cl. ...................... 166/261; 166/272; 166/274
[58] Field of Search ............ 166/261, 272, 273, 274

[56] References Cited

U.S. PATENT DOCUMENTS

| | | | |
|---|---|---|---|
| 2,862,558 | 12/1958 | Dixon | 166/272 |
| 3,263,750 | 8/1966 | Hardy | 166/261 |
| 3,339,634 | 9/1967 | Van Meter, Jr. et al. | 166/261 |
| 3,402,770 | 9/1968 | Messenger | 166/272 |
| 3,593,790 | 7/1971 | Herce | 166/272 |
| 3,768,559 | 10/1973 | Allen et al. | 166/272 |
| 3,838,738 | 10/1974 | Redford et al. | 166/272 |
| 3,881,550 | 5/1975 | Barry | 166/272 |
| 4,071,458 | 1/1978 | Allen | 166/272 |
| 4,158,638 | 6/1979 | Tsai | 166/272 |
| 4,207,945 | 6/1980 | Hall et al. | 166/272 |

FOREIGN PATENT DOCUMENTS 1034485 7/1978 Canada .................. 166/261

Primary Examiner—Stephen J. Novosad
Assistant Examiner—William P. Neuder
Attorney, Agent, or Firm—Alexander J. McKillop; Michael G. Gilman; Lawrence O. Miller

[57] ABSTRACT

This specification discloses a method for the recovery of oil from a subterranean, viscous asphaltic oil-containing formation comprising injecting a predetermined amount of a solution comprising an aromatic hydrocarbon and an acid selected from the group consisting of phenol, carboxylic acid, and acidic anhydrite. Thereafter, the formation is subjected to a thermal recovery technique such as steam flooding or an in-situ combustion operation and oil is recovered.

11 Claims, No Drawings

RECOVERY OF VISCOUS OIL FROM ASPHALTIC OIL-CONTAINING FORMATIONS

FIELD OF INVENTION & BACKGROUND OF THE INVENTION

1. Field of the Invention

This invention relates to a method for recovering oil from a subterranean, viscous asphaltic oil-containing formation utilizing injection of a solution containing an aromatic hydrocarbon and an acid into the formation combined with a thermal recovery method such as steam flooding or in-situ combustion.

2. Background of the Invention

In the recovery of oil from oil-containing formations, it usually is possible to recover only minor portions of the original oil in place by the so-called primary recovery methods which utilize only the natural forces present in the formation. Thus, a variety of supplemental recovery techniques have been employed in order to increase the recovery of oil from subterranean formations. These techniques include thermal recovery methods, waterflooding and miscible flooding.

The thermal recovery methods generally include steam injection, hot water injection and in-situ combustion. In addition, variations and improvements in these basic techniques have been employed such as the "huff and puff" method utilizing steam, and the reverse in-situ combustion technique. Improvements have also been set forth in the in-situ combustion method that employ the use of water injection, either simultaneously or intermittently with the air or oxygen-containing gas to scavenge the residual heat in the formation and also to improve the conformance and sweep efficiency.

My invention proposes a method which greatly enhances the recovery of oil from a subterranean, viscous asphaltic oil-containing formation by injecting a solution comprising a mixture of an aromatic hydrocarbon and an acid into the formation that synergistically reduces the viscosity of the oil combined with a thermal recovery technique such as steam flooding or in-situ combustion.

SUMMARY

The invention is a method for recovering oil from a subterranean, viscous asphaltic oil-containing formation penetrated by at least one injection well and at least one spaced-apart production. The injection well and production well are in fluid communication with a substantial portion of the formation. Initially, a predetermined amount of a solution comprising an aromatic hydrocarbon and an acid selected from the group consisting of phenol, carboxylic acid, and acidic anhydrite is injected into the formation via the injection well. The concentration of the selected acid in the solution is in the range of 45 to 60 weight percent and the amount of solution injected is within the range of 0.005 to 0.05 pore volume. Suitable aromatic hydrocarbons include m-xylene, o-xylene, benzene, toluene and aromatic cutter stock, preferably toluene. Thereafter, steam is injected into the formation causing a synergistic reduction in the viscosity of the oil and displacing the mobilized oil toward the production well through which it is recovered. In another embodiment, after the solution is injected into the formation, a combustion supporting gas such as air or oxygen or mixtures of air and oxygen is injected into the formation via the injection well to establish an in-situ combustion front in the formation and thereby cause a synergistic reduction in the viscosity of the formation oil. Injection of the combustion supporting gas is continued to advance the combustion front through the formation and displaces the mobilized oil toward the production well through which it is recovered.

DESCRIPTION OF THE PREFERRED EMBODIMENT

A subterranean, viscous asphaltic oil-containing formation is penetrated by at least one injection well and at least one spaced-apart production well. The injection well and production well are in fluid communication with a substantial portion of the oil-containing formation by means of perforations.

A predetermined amount of a solution comprising a mixture of an aromatic hydrocarbon and an acid selected from the group consisting of phenol, carboxylic acid, and acidic anhydrite, is injected into the formation via the injection well. Suitable aromatic hydrocarbons include m-xylene, o-xylene, benzene, toluene and aromatic cutter stock, preferably toluene. The aromatic hydrocarbon contains 45 to 60 weight percent of the selected acid and the amount of the aromatic hydrocarbon/acid solution injected into the formation is within the range of 0.005 to 0.05 pore volume, preferably 0.01 pore volume.

Once the desired amount of aromatic hydrocarbon/acid solution is injected into the injection well, steam is injected into the formation via the injection well and fluids including oil are recovered from the formation via the production well. The steam invades the formation dissipating its heat and causing a synergistic reduction in the viscosity of the oil contacted by the previously injected solution thereby enhancing its recovery. While it is not completely understood why a synergistic reduction in viscosity occurs, and it is not desired to be bound by any particular theory, it is believed that it is the result of the acid neutralizing basic components in the oil or as a result of lowering the concentration of asphaltene-like species in the oil. Injection of steam and production of oil is continued until the fluid being recovered from the production well comprises an unfavorable ratio of oil to water or oil to steam.

In another embodiment of the invention, the slug of aromatic hydrocarbon containing the selected acid may be injected simultaneously during steam injection. In still another embodiment, instead of injecting a single slug of aromatic hydrocarbon/acid solution, a plurality of slugs of solution may be periodically injected into the formation so as to induce maximum viscosity reduction of the asphaltic formation oil. The number of slugs of solution will depend upon the characteristics of the formation, well spacing, etc.

In still a further embodiment of the invention, injection of a predetermined amount of the above described aromatic hydrocarbon/acid solution may be followed by initiation of an in-situ combustion operation by injecting a combustion supporting gas such as air or oxygen or mixtures of air and oxygen into the formation via the injection well. In-situ combustion establishes a combustion front in the formation adjacent the injection well that moves from the injection well to the production well as injection of the combustion supporting gas is continued and fluids including oil are recovered from the formation via the production well until the fluid being recovered comprises an unfavorable ratio of oil to water or oil to steam. The heat generated by the in-situ combustion operation causes a synergistic reduction in the viscosity of the formation oil contacted by the previously injected aromatic hydrocarbon/acid solution thereby enhancing its recovery. During the in-situ combustion operation, if desired, slugs of the solution may be intermittently injected to further reduce the viscosity of the formation oil. If desired, the in-situ combustion operation may be conducted as a wet in-situ combustion operation wherein water and/or saturated steam is injected into the formation via the injection well simultaneously with the combustion supporting gas.

EXPERIMENTAL EVALUATION

For the purpose of demonstrating the effectiveness of the proposed process, the following laboratory experiments were performed.

EXAMPLE 1

To a Cold Lake (Alberta) heavy asphaltic oil having a viscosity of 48,000 cp at 77° F., phenol 1 weight percent was added. The oil viscosity was reduced to 22,000 cp at 77° giving a viscosity reduction of 54%.

EXAMPLE 2

A second laboratory experiment was devised for evaluating the effect of phenol added to the asphaltic heavy oil under thermal processing conditions. Reagent grade phenol (1 wt %) was added to a Cold Lake heavy asphaltic oil having a viscosity of 48,000 up at 77° F. and this mixed oil was heated to 570° F. to simulate the high temperature prevailing in a steam drive process or the temperature prevailing in the cracking and vaporization zone ahead of the flame front in an in-situ combustion operation. After 48 hours, the viscosity of the oil decreased to 10,500 cp at 77° F. In the absence of phenol, after 48 hrs at 570° F. the viscosity was reduced only 24,000 cp. This synergistic effect of lowering the viscosity of the heavy asphaltic oil will enhance its recovery.

By the term "pore volume" as used herein, is meant that volume of the portion of the formation underlying the well pattern employed as described in greater detail in U.S. Pat. No. 3,927,716 to Burdyn et al, the disclosure of which is hereby incorporated by reference.

While the invention has been described in terms of a single injection well and a single spaced apart production well, the method according to the invention may be practiced using a variety of well patterns. Any other number of wells, which may be arranged according to any patterns, may be applied in using the present method as illustrated in U.S. Pat. No. 3,927,716 to Burdyn et al.

From the foregoing specification one skilled in the art can readily ascertain the essential features of this invention and without departing from the spirit and scope thereof can adapt it to various diverse applications. It is my intention and desire that my invention be limited only by those restrictions or limitation as contained in the claims appended immediately hereinafter below.

What is claimed is:

1. A method for recovering oil from a subterranean, viscous asphaltic oil-containing formation penetrated by at least one injection well and at least one spaced-apart production well, said injection well being and said production well in fluid communication with a substantial portion of said formation, comprising:
   (a) injecting into said formation via said injection well 0.005 to 0.05 pore volume of a solution comprising a mixture of an aromatic hydrocarbon and an acid selected from the group consisting of phenol, carboxylic acid, and acidic anhydrite, said solution containing 45 to 60 weight percent of said acid;
   (b) injecting steam into the formation via said injecting well thereby causing a synergistic reduction in the viscosity of the formation oil; and
   (c) continuing injecting steam and recovering fluids including oil from the formation via said production well.

2. The method of claim 1 wherein the step of injecting said solution of acid and an aromatic hydrocarbon according to step (a) is intermittently repeated for a plurality of cycles.

3. The method of claim 1 wherein the solution of an acid and an aromatic hydrocarbon is injected simultaneously with the steam.

4. The method of claim 1 wherein the aromatic hydrocarbon is selected from the group consisting of m-xylene, o-xylene, benzene, toluene and aromatic cutter stock.

5. The method of claim 1 wherein the aromatic hydrocarbon is toluene.

6. A method for recovering oil from a subterranean, viscous asphaltic oil-containing formation penetrated by at least one injection well and at least one spaced-apart production well, said injection well and said production well being in fluid communication with a substantial portion of said formation, comprising:
   (a) injecting into said formation via said injection well 0.005 to 0.05 pore volume of a solution comprising a mixture of an aromatic hydrocarbon and an acid selected from the group consisting of phenol, carboxylic acid, and acidic anhydrite, said solution containing 45 to 60 weight percent of said acid;
   (b) initiating an in-situ combustion operation in the formation by injecting a combustion supporting gas into the injection well so as to establish an in-situ combustion front in said formation;
   (c) continuing to inject said combustion supporting gas to support the in-situ combustion front causing a synergistic reduction in the viscosity of the formation oil and displacing the mobilized oil through the formation toward said production well; and
   (d) recovering fluids including oil from the formation via said production well.

7. The method of claim 6 further including the step of injecting steam into the formation via the injection well during the in-situ combustion operation.

8. The method of claim 6 further including the step of injecting water via the injection well during the in-situ combustion operation.

9. The method of claim 6 wherein the step of injecting a solution of acid and an aromatic hydrocarbon according to step (a) is intermittently repeated for a plurality of cycles.

10. The method of claim 6 wherein the aromatic hydrocarbon is selected from the group consisting of m-xylene, o-xylene, benzene, toluene and aromatic cutter stock.

11. The method of claim 6 wherein the aromatic hydrocarbon is toluene.

* * * * *

UNITED STATES PATENT AND TRADEMARK OFFICE
CERTIFICATE OF CORRECTION

PATENT NO. : 4,469,177
DATED : September 4, 1984
INVENTOR(S) : V.N. VENKATESAN

It is certified that error appears in the above—identified patent and that said Letters Patent are hereby corrected as shown below:

Column 4, line 9: "said injecting" should be --said injection--.

Signed and Sealed this

Twelfth Day of February 1985

[SEAL]

Attest:

DONALD J. QUIGG

*Attesting Officer*     *Acting Commissioner of Patents and Trademarks*